United States Patent

[11] 3,556,482

| [72] | Inventor | Walter D. Whitney<br>1044 San Remo Way, San Carlos, Calif. 94070 |
|---|---|---|
| [21] | Appl. No. | 778,094 |
| [22] | Filed | Nov. 22, 1968 |
| [45] | Patented | Jan. 19, 1971 |

[54] PULLING APPARATUS
5 Claims, 3 Drawing Figs.

[52] U.S. Cl. .................................................. 254/134,
72/705
[51] Int. Cl. ..................................................... B66f 3/00
[50] Field of Search............................................ 254/1, 93,
134; 72/446, 447, 453, 705

[56] References Cited
UNITED STATES PATENTS

| 3,029,859 | 4/1962 | Grant .......................... | 72/705X |
| 3,398,565 | 4/1968 | Whitney...................... | 72/705X |

Primary Examiner—Andrew R. Juhasz
Assistant Examiner—David R. Melton
Attorney—Gordon Wood ABSTRACT: Pulling apparatus particularly adapted for use under emergency conditions for applying a heavy pulling force to the body of an automobile for opening a closed door or other heavy work. The apparatus may be collapsed so as to permit its storage in a small space as, for example, the trunk of an automobile, and may be quickly erected at the site of an automobile accident for immediate operation.

INVENTOR.
WALTER D. WHITNEY
BY Gordon Wood.
ATTORNEY

PULLING APPARATUS

This invention relates to a pulling apparatus, particularly adapted for bending or straightening heavy frames and sheet metal members, such as is required in repairing damage to automobile bodies and frames.

The use for which the present invention may be employed is somewhat similar to that of the hydraulic pulling device shown in U.S. Patent No. 3,398,565, however, the present invention is particularly adapted for use in situations where a portable apparatus is required, such as at the scene of an accident.

Numerous serious injuries and deaths have been caused by accidents involving automobiles traveling at a high rate of speed and in many instances the damage to the automobile body and frame is so severe as to prevent opening the doors to permit removal of the occupant or occupants. In some cases it is necessary to wait for long periods of time until cutting torches are brought from considerable distances away so that it is impossible to give immediate assistance to seriously injured occupants.

The present invention consists of an apparatus that is portable and which may be readily stored in the trunk of an automobile such as a police car, and which is adapted to be employed in a matter of minutes to remove or at least open a door of an automobile to gain access to the injured occupants. In other situations the present invention may be employed to bend or tear loose parts of the automobile which may be trapping an occupant.

The conventional type of apparatus employed in a repair shop for bending and straightening various portions of an automobile body or chassis are bulky in nature and not adapted to be carried conveniently in a vehicle. For example, the frame shown in U.S. Patent No. 3,398,565 is of conventional type and is limited for use under ideal conditions.

Other objects and advantages of the invention will be apparent from the following specifications and from the drawings.

Figure 1:
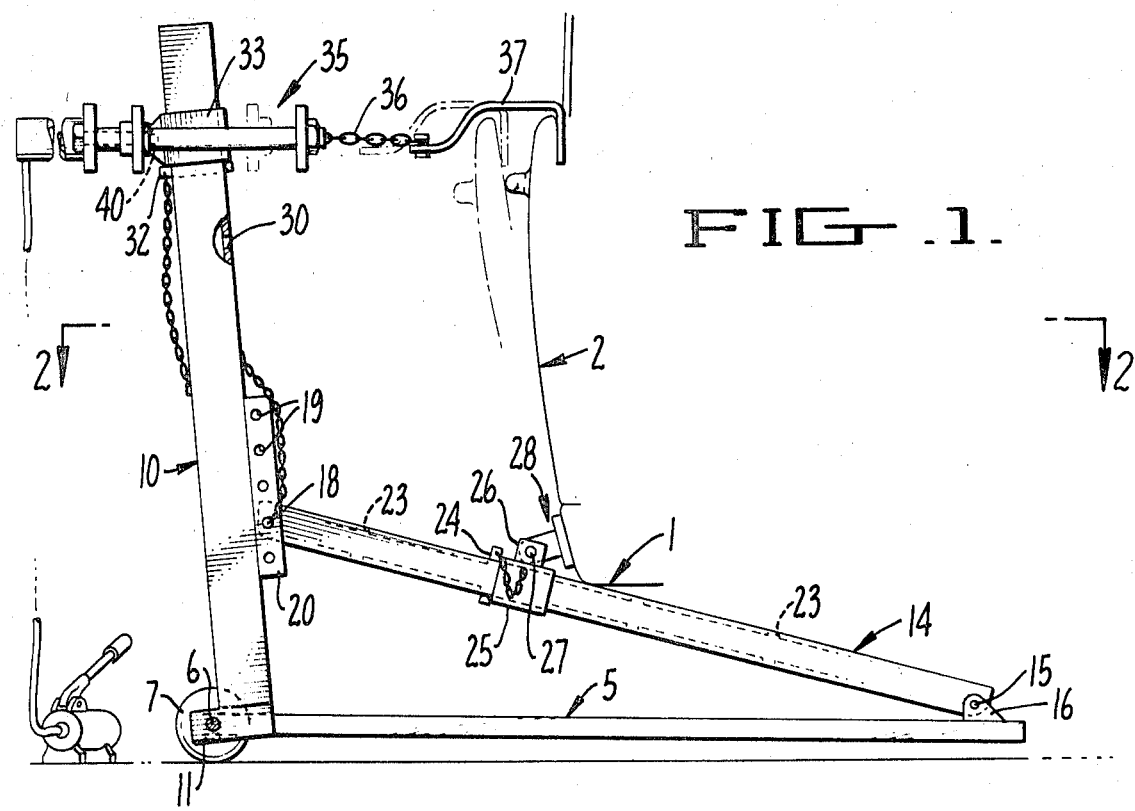
FIG. 1 is a side elevation of the preferred form of the apparatus.
Figure 2:
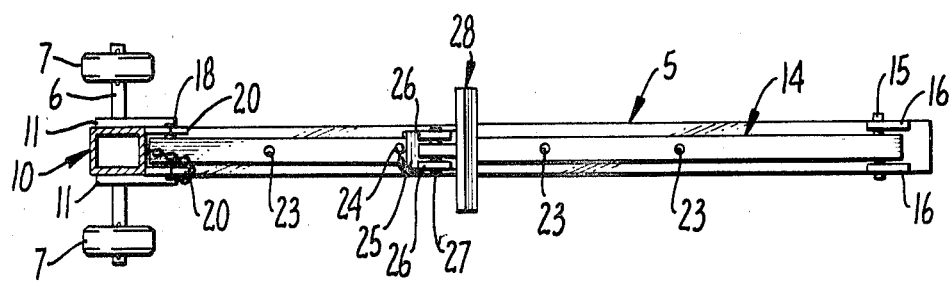
FIG. 2 is a horizontal cross section through the post of the apparatus of FIG. 1 showing the remainder of the apparatus in top plan view.

In detail, and as best seen in FIG. 1, the invention will be described in connection with its use on an automobile body and specifically its use for opening or removing a distorted automobile door. In FIG. 1, the base of the automobile body below the door is indicated at 1 and the door panel itself is indicated at 2.

In most serious accidents the door 2 may be distorted to such an extent that it is impossible to open the same with readily available means. The invention will be described with reference to the operation of freeing such a door.

The apparatus of the invention comprises an elongated tubular base member of rectangular cross section indicated at 5 which is apertured at one end to receive a horizontally disposed shaft 6 therethrough. Rotatably mounted on shaft 6 are a pair of ground wheels 7 which may be employed for transporting the apparatus from one position to another. Extending upwardly from base member 5 and substantially perpendicular thereto is a post 10 which is preferable formed of structural tubular material of rectangular cross section and which has fixedly secured to its lower end a pair of rectangular plates 11 which are pivoted on the shaft 6 at a point offset from the center line of post 10. The post 10 is maintained in substantially the position shown in FIG. 1 by means of a brace generally designated 14 which is provided with a pivot 15 at one end for swingably securing said brace to a pair of ears 16 welded to the outer end of base member 5. The opposite end of brace 14 is provided with a pivot pin 18 which extends through brace 14 and through a pair of holes 19 formed in a pair of flat bars 20 welded along the length of post 10. By this structure the angularity of brace 14 relative to base 5 may be adjusted to suit the particular condition existing.

Brace 14 is provided at spaced points along its length with through holes 23 so that a pin 24 may be placed in any one of said holes as desired. Slidably mounted on base 14 is a rectangular sleeve 25 to which is welded a pair of ears 26 between which extends a pin 27.

Swingably mounted in pin 27 is a bearing pad generally designated 28 which is adapted to be placed against the lower corner portion 1 of the body of the automobile (FIG. 1).

The post 10 is provided at spaced points along its length with through openings 30 so that the pin 32 may be passed through said openings for the purpose of supporting a sleeve 33 which in turn supports the pulling unit generally designated 35. The pulling unit 35 is not described in detail here and may be similar to the unit shown in U.S. Pat. No. 3,398,565. This pulling unit is provided with an adjustable chain 36 and a hook member 37 which may be driven into the space between the door panel and the door window as best seen in FIG. 1.

It will be apparent upon application of tension to chain 36 by pulling unit 35 that the bearing pad 28 and brace 14 form an anchor for firmly engaging the lower portion of the body, thereby providing an abutment against which the apparatus may apply sufficient force to permit the hook 37 to pull the door panel 2 out of the door frame or at least distort the same sufficiently to permit the door to be opened. Brace 14 also acts as an abutment.

The present invention contemplates devices other than hook 37 which may be employed to connect to the particular portion of the body or frame on which it is desired to apply the pulling force. For example, a toggle type harpoon may be driven into the door panel so as to create sufficient resistance to pulling when it is not possible to employ a hook.

Figure 3:
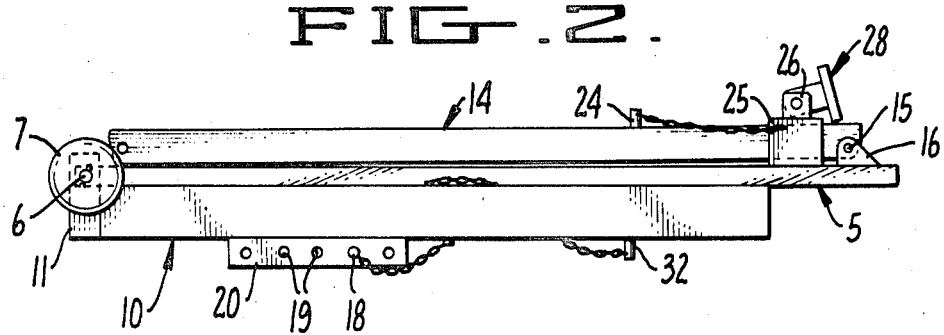
FIG. 3 is a plan view of the apparatus shown in its knocked down stored condition.

An important feature of the present invention resides in its portability which permits its use in emergency situations without loss of valuable time. In this connection it will be seen that the pulling unit 35 may be removed simply by sliding it upwardly and off the upper end of post 10 and will also be seen that, by removing the pin 18, the post 10 may be swung almost 270° to a position alongside base member 5 and on the opposite side thereof as best seen in FIG. 3. Also, as seen in FIG. 3, the brace 14 may be stored in a position alongside base 5. The apparatus in the collapsed condition of FIG. 3 may readily be stored in the trunk of an automobile and assembled in the working position of FIG. 1 in a matter of minutes.

It is important to note that the provision of holes 19 and the provision of holes 23, in combination, permit the bearing pad 28 to be placed in any one of a great variety of positions depending on the particular position of the automobile involved. Furthermore, since the pulling unit 35 is pivotally supported on the sleeve 33 by pivot 40 the pulling effort may be directed along almost any desired line of action. Since pin 32 may be removed from one pair of holes 30 and placed in another pair of holes, flexibility in the positioning of pulling unit 35 and also in its line of action it is thereby permitted.

The invention also contemplates the use of the portable frame in other situations. For example, if it were desired to free an occupant from under the instrument panel of an automobile, the apparatus may be applied across the door frame so as to permit the pulling unit 35 to tear the instrument panel away or to bend the same sufficiently to permit the removal of such occupant.

I claim:
1. Pulling apparatus comprising:
 an elongated base member;
 a post secured at one of its ends to one end of said base member and extending outwardly from the latter;
 means on said post for securing a pulling device thereto;
 a brace extending between a point on said base and a point intermediate the ends of said post; and
 abutment means adjustably secured to said brace at a point intermediate the ends thereof and adapted to engage a fixed object to permit said device to exert a pull from said post.

2. An apparatus according to claim 1 wherein said post is provided with means for securing said brace thereto at various points along the length of said post to permit disposing said brace at various degrees of angularity relative to said base.

3. Apparatus according to claim 1 wherein said brace is provided with means for securing said abutment means thereto at various points along the length of said brace.

4. Apparatus according to claim 1 wherein said brace is swingably secured at one end to said base member and releasably secured to said post at its opposite end to permit disposing said brace substantially alongside and parallel to said base.

5. Apparatus according to claim 4 wherein said post is pivotally secured to said base member to permit swinging said post from a position extending substantially at right angles to said base member at one side of the latter to a position on the opposite side of said base member and substantially parallel thereto.